United States Patent Office 3,539,681
Patented Nov. 10, 1970

3,539,681
PROCESS FOR THE MANUFACTURE OF EXTENSIBLE MOULDED ARTICLES HAVING PERFORATED OR RETICULATED STRUCTURE
Federico Esteve Anglada, 35 Ronda Universidad, and Juan Duarry Serra, 1 Calle Rosellon, both of Barcelona, Spain
Filed Mar. 15, 1966, Ser. No. 534,299
Claims priority, application Spain, Mar. 18, 1965, 311,070
Int. Cl. B29c 13/00
U.S. Cl. 264—306  1 Claim

ABSTRACT OF THE DISCLOSURE

Moulded reticulated articles of elastomeric material are made by using a mould having prominences arranged to produce the reticulations in the finished article. The surfaces of the mould are treated to make the material directly adherent thereto, but the tops of the prominences are treated to make them non-adherent to the material.

---

The present invention relates to a process for the manufacture of moulded articles with perforated or reticulated structure, of natural or synthetic rubber or of a synthetic plastic material.

There are known different processes for the manufacture of perforated or reticulated structures of rubber, latex or a synthetic plastic material, e.g. for elastic bandages, corsets, shoes, orthopedic and other articles, according to which the rubber mixture or the mixture of a synthetic plastic material is deposited on the corresponding moulds by pulverization, electrolitic bathes or pressure rolls. However, the manufacture of such reticulated structures by means of the known dipping process, which is broadly used for the manufacture of moulded articles with thin walls and continuous surfaces, has been considered as impossible hitherto. As the known processes for the manufacture of such perforated or reticulated structures present many disadvantages due to their difficult industrial realization or small efficiency, the inventors, having effected investigations with the aim to overcome the difficulties which hitherto have not allowed the manufacture of said structures by means of the dipping process, have found an improved dipping process, which is the object of the present invention and which allows the manufacture of said perforated or reticulated structures under more favourable conditions as by any of the processes known hitherto.

It is therefore the object of the present invention to provide a dipping process allowing the manufacture of moulded articles with perforated or reticulated structure.

This process is essentially characterized by the utilization of a dipping mould of some hard material having a shape similar to that of the article to be produced and provided on its moulding surface with multiple small pyramid or cone like prominences, determined by multiple crossed grooves or slots and having a height corresponding to the thickness of the wall of the article to be obtained and being adapted to produce with their tops corresponding holes in this article, said process comprising the steps of moistening the mould, by immersion, pulverization or another method, with a solution or dispersion of a coagulating agent of the latex of natural or synthetic rubber or of the suspension of the synthetic plastic material with which the article is to be produced; submitting the moistened mould to drying at an appropriate temperature in order to evaporate the suspension or dissolution liquid from the coagulating agent; rubbing the dried mould so that the coagulating agent covering the tops of the multiple pyramid or cone like prominences is completely eliminated; dipping the so prepared mould into the mixture of latex of natural or synthetic rubber containing the necessary ingredients for its later vulcanization or being already prevulcanized, or dipping the mould into the bath of the suspension of the synthetic plastic material; leaving the mould in this bath for the time necessary to obtain the desired thickness of the deposited material; removing the mould from the bath; revolving the mould and exposing it to heat in a tunnel stove or oven for drying and/or vulcanization of the deposited coating; and, finally, separating the obtained article from the mould.

Another feature of the present invention consists in that the said grooves or slots, which in the mould determine the cited multiple prominences, are provided with unpolished ground and lateral surfaces to facilitate the adherence of the coagulating agent and therefore of the material which in the dipping process is to be deposited on the same, while the tops of the proper prominences are provided with polished surfaces to facilitate the elimination of the coagulating agent by frictioning and to assure that these tops remain uncovered from the coagulated material in the dipping process and determine corresponding holes in the wall of the moulded article.

Still another feature of the invention consists in that after recovering the mould by the coagulating agent, the drying of the same and its subsequent elimination by polishing the tops of its multiple prominences, there is applied on these tops an antiadhesive material, such as silicone.

For the better understanding of the invention, one embodiment thereof is described with reference to the accompanying drawings, in which.

Figure 1:
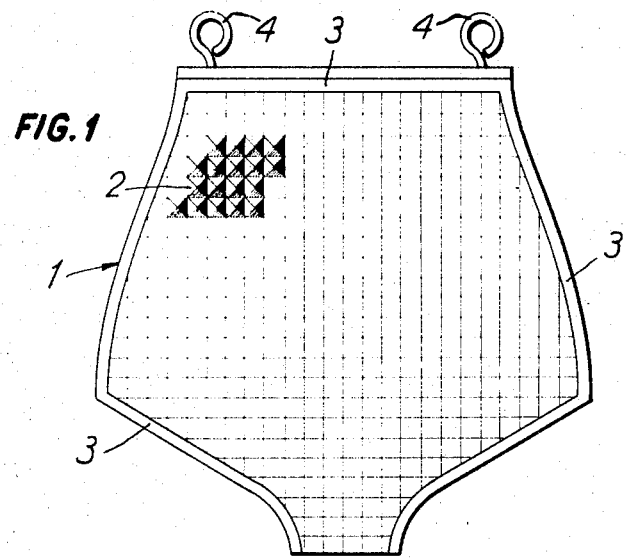
FIG. 1 represents a diagrammatic front elevational view of an appropriate mould for the manufacture of a corset according to the process of the present invention.

With reference to FIG. 1, there is represented diagrammetically a mould 1. This mould, suitable for the manufacture of corsets, may be constituted of some hard material, e.g. aluminium, glazed porcelain or the like and is provided on its moulding surface with multiple small pyramid like prominences 2, determined by multiple crossed grooves or slots having a height corresponding to the thickness of the wall of the article to be obtained and adapted to produce with their tops corresponding holes in this article. In this example, the mould as represented has a plane surface on its lateral borders 3, adapted to produce in the moulded corset, at the sides and at the border of the openings for the passage of the legs, corresponding unperforated strengthenings. The mould 1 is provided with two fastening rings 4, arranged on its upper part and by which the mould is suspended during the dipping process in a manner known per se.

Figure 3:
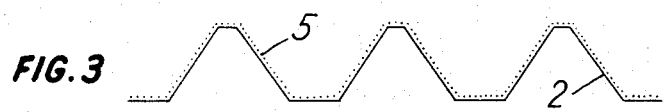
FIGS. 3 to 6 illustrate, with respect to the sectional view of the portion of the mould represented in FIG. 2, successive phases of the process of the invention.
Figure 4:
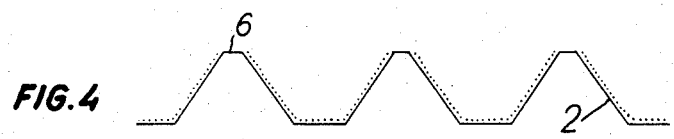
Figure 5:
Figure 6:
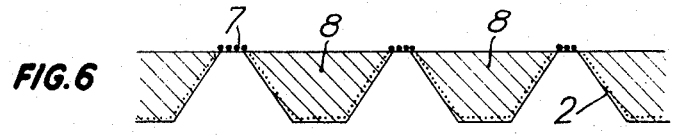

For performing the process according to the invention, the mould 1 is submitted to successive operations as shown diagrammatically in FIGS. 3 to 6. First of all the mould is moistened by immersion, pulverization or another method, by means of a solution or dispersion of a coagulating material of the latex of natural or synthetic rubber, or of the suspension of the synthetic plastic material with which the article is to be produced. Such coagulating material may be e.g. calcium nitrate, ammonium acetate, sodium nitrate, etc. Thereafter the mould is submitted to drying in such manner, that once evaporated the suspension liquid or the dissolution liquid of the coagulating material, this material constitutes a coating of the whole surface of the mould, as shown at 5 (FIG. 3). Then a frictioning object is passed over the multiple tops of the pyramid or cone like prominences 2 of the mould for completely eliminating the coagulating material deposited on said tops, in such manner, that these tops result uncoated, as may be seen at 6 (FIG. 4). On the tops so liberated from the coagulating material, there may be applied optionally an antiadhesive material like silicone as illustrated diagrammatically at 7 (FIG. 5). The mould so prepared then is dipped, in a manner known per se, into the mixture of latex of natural or synthetic rubber containing the necessary ingredients for its later vulcanization, or into such a mixture already prevulcanized, or into the suspension bath of the synthetic plastic material, and left therein for the time necessary to obtain the desired thickness of the deposited material, shown at 8 in FIG. 6. Finally and as herein before described, the deposited material forming the coating 8 is dried and/or vulcanized, and the obtained article is separated from the mould.

Figure 2:
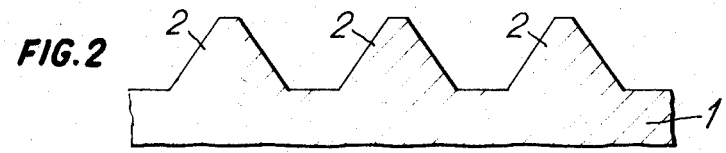
FIG. 2 shows a sectional view on an enlarged scale of a portion of said mould.
Figure 7:
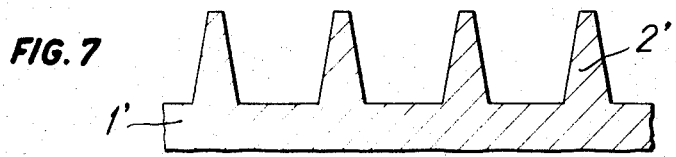
FIG. 7 is a sectional view, similar to that of FIG. 2, showing a modification of the shape of the mould surface.

The modification represented in FIG. 7, in which the body of the mould is designated with 1' and the multiple small pyramid or cone like prominences provided on the moulding surface are designated with 2', shows that said prominences may have a more or less inclined lateral surface. In the case of FIG. 2, the prominences 2 determine in the perforated or reticulated structure corresponding holes which are very open on one of the faces of the structure, whereas the prominences 2' determine far more closed holes. According to the effects which are to be obtained, said prominences may have any other shape.

In one or another of these cases, the spaces between said multiple prominences, as well as the lateral surfaces of these will be prepared to facilitate the adherence of the coagulating material. Generally, this effect may be achieved by leaving the said surfaces unpolished. In contrast thereto, the tops 6 of of said prominences, on which no coagulating material must be left adhered, are provided with polished surface.

It may be understood that though in FIG. 1 there is shown a mould for the manufacture of corsets, the very same process may be applied for the manufacture of any other moulded article having thin walls and being provided with multiple perforations.

What we claim is:
1. Process for the manufacture of extensible moulded articles having a reticulated structure of elastomeric material, by using a dipping mould of a hard non-absorbent material having a shape similar to that of the article to be produced and provided on its moulding surface with multiple small outwardly projecting prominences determined by multiple crossed grooves and having a height corresponding to the thickness of the wall of the article to be obtained, comprising the steps of moistening the mould with a coagulating agent of the plastic material from which the article is to be produced, drying the moistened mould to evaporate the liquid from the coagulating agent, rubbing the dried mould so that the coagulating agent covering the tops of the prominences is completely eliminated, applying an anti-adhesive material to the tops of the prominences, dipping the thus prepared mould into a bath of elastomeric material containing the necessary ingredients for its later solidification, leaving the mould in this bath for the time necessary to obtain the desired thickness of the deposited material, removing the mould from the bath, revolving the mould and exposing it to heat in a tunnel oven for drying and solidifying of the deposited coating, and separating the article from the mould.

References Cited
UNITED STATES PATENTS

| | | | |
|---|---|---|---|
| 1,923,524 | 8/1933 | Young | 18—41 |
| 2,525,272 | 10/1950 | Rhoton | 264—307 X |
| 2,638,632 | 5/1953 | Glazer | 18—41 X |
| 2,875,501 | 3/1959 | Gravely | 264—306 X |
| 3,005,237 | 10/1961 | Anderson | 264—306 X |
| 1,475,738 | 11/1923 | Boecler | 264—306 |
| 1,996,051 | 4/1935 | Twiss | 264—306 |
| 2,294,966 | 9/1942 | Dreyfus. | |
| 2,295,735 | 9/1942 | Hurt | 264—306 X |
| 2,559,969 | 7/1951 | Kennedy | 117—5.5 X |
| 2,804,653 | 9/1957 | Talalay | 264—338 X |
| 2,934,790 | 5/1960 | Shwayder. | |
| 2,977,636 | 4/1961 | McGuire | 264—303 X |
| 3,303,254 | 2/1967 | Simons | 264—318 X |
| 3,384,502 | 5/1968 | Japs | 117—5.5 |

ROBERT F. WHITE, Primary Examiner

J. R. HALL, Assistant Examiner